United States Patent [19]

Plantan

[11] Patent Number: 5,445,440

[45] Date of Patent: Aug. 29, 1995

[54] FULL-FUNCTION VALVE FOR HEAVY DUTY SEMI-TRAILER BRAKE SYSTEMS

[75] Inventor: Ronald S. Plantan, Charlotte, N.C.

[73] Assignee: Echlin Inc., Branford, Conn.

[21] Appl. No.: 213,164

[22] Filed: Mar. 15, 1994

[51] Int. Cl.⁶ .................................................. B60T 13/00
[52] U.S. Cl. ........................................ 303/7; 303/9.76; 303/9
[58] Field of Search .................... 303/9.61, 7, 9, 9.75, 303/9.76, 28, 40, 71; 188/70

[56] References Cited

U.S. PATENT DOCUMENTS

| | | | |
|---|---|---|---|
| 3,947,072 | 3/1976 | Plantan | 303/13 |
| 4,003,606 | 1/1977 | Plantan | 303/9 |
| 4,230,373 | 10/1980 | Plantan | 303/7 |
| 4,261,624 | 4/1981 | Plantan | 303/7 |
| 4,915,456 | 4/1990 | Gross et al. | 303/9 |
| 5,046,786 | 9/1991 | Johnston et al. | 303/7 |
| 5,236,250 | 8/1993 | Moody et al. | 303/7 |

Primary Examiner—Josie A. Ballato
Attorney, Agent, or Firm—Arnold, White & Durkee

[57] ABSTRACT

A unitary full-function valve is used to control the operation of a service brake system and a spring brake system. The valve includes a valve body that has multiple ports, including separate ports for providing fluid communication to a spring brake chamber, a service brake chamber, a fluid reservoir and an exhaust port. The valve body also has ports for receiving pressurized supply fluid and control fluid. The supply fluid inhibits the activation of the spring brakes so that the spring brakes are activated when no supply fluid is present. The control fluid is used to activate the service brakes on demand. A biased one-way pressure protection valve is disposed in the valve body to isolate fluid in the service brake system from fluid in the spring brake system when the pressure in the service brake system falls below a variable pressure level. A passageway within the valve body connects the fluid in the spring brake system with the biased pressure protection valve to increase the variable pressure level in proportion to the pressure level in the spring brake system.

4 Claims, 14 Drawing Sheets

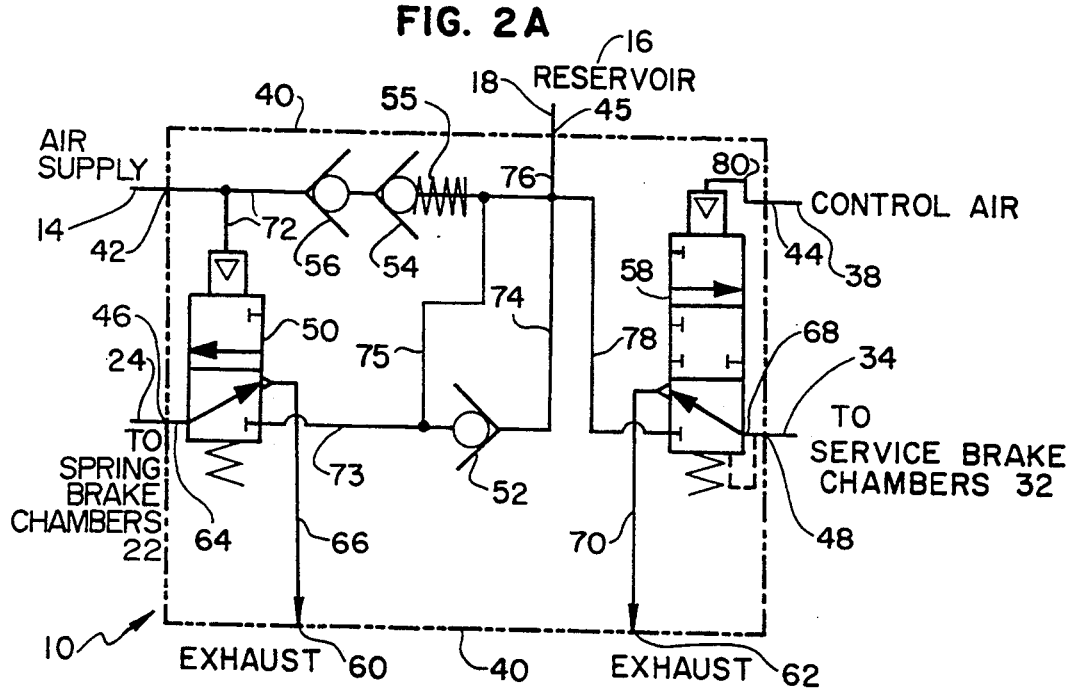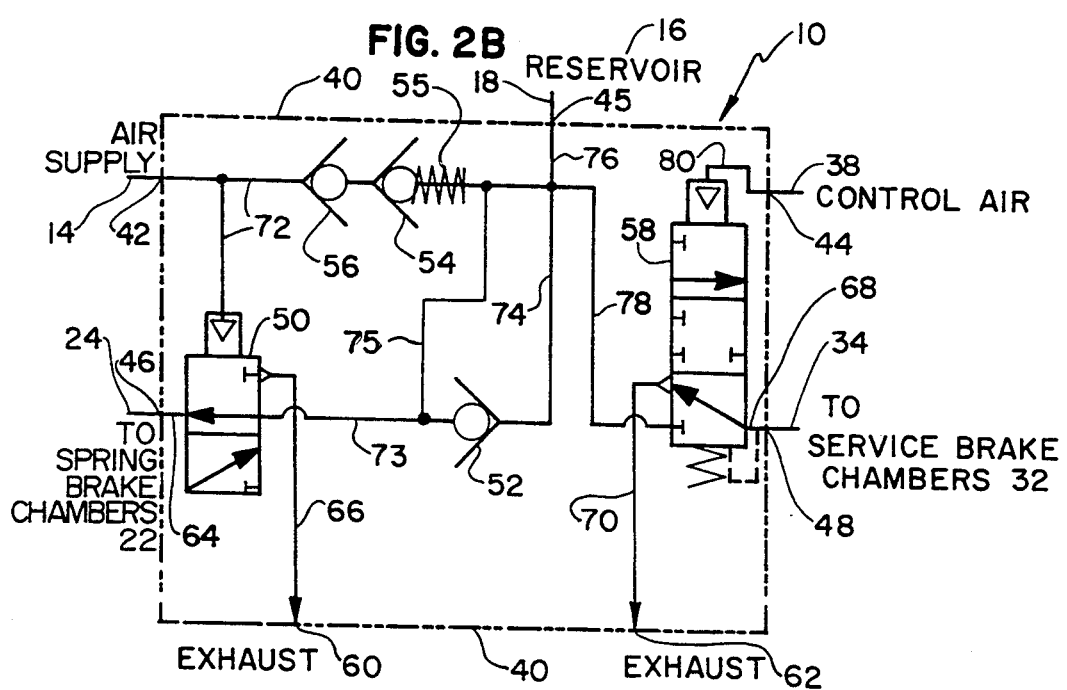

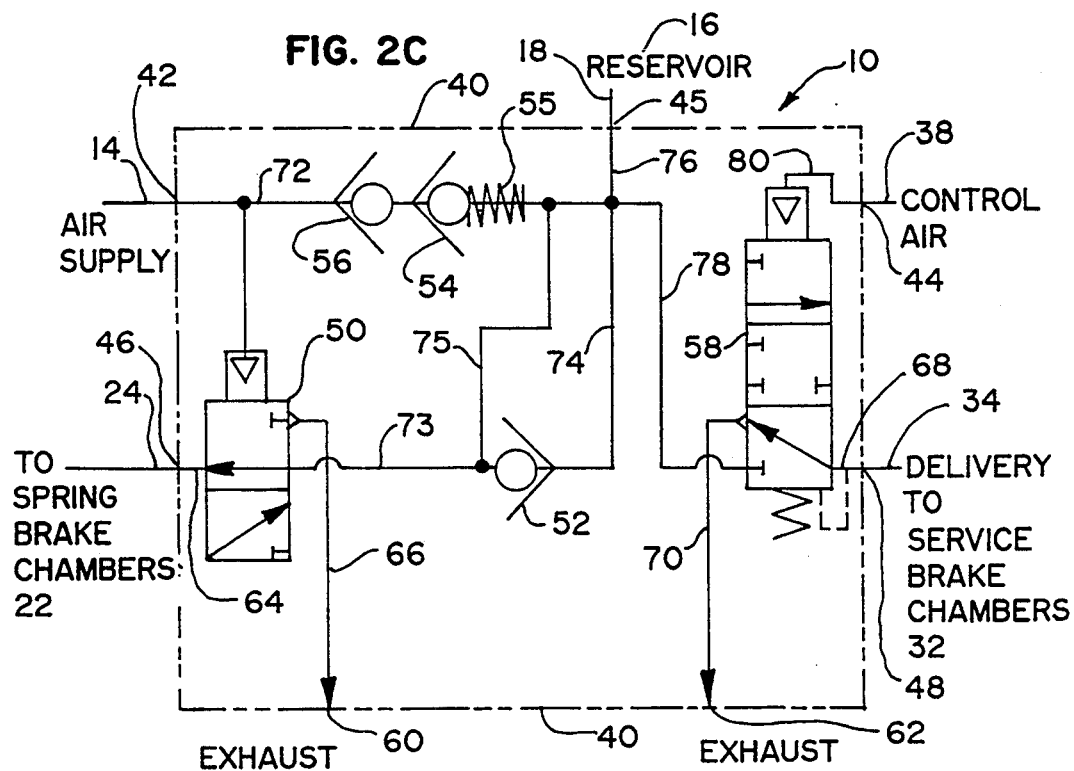
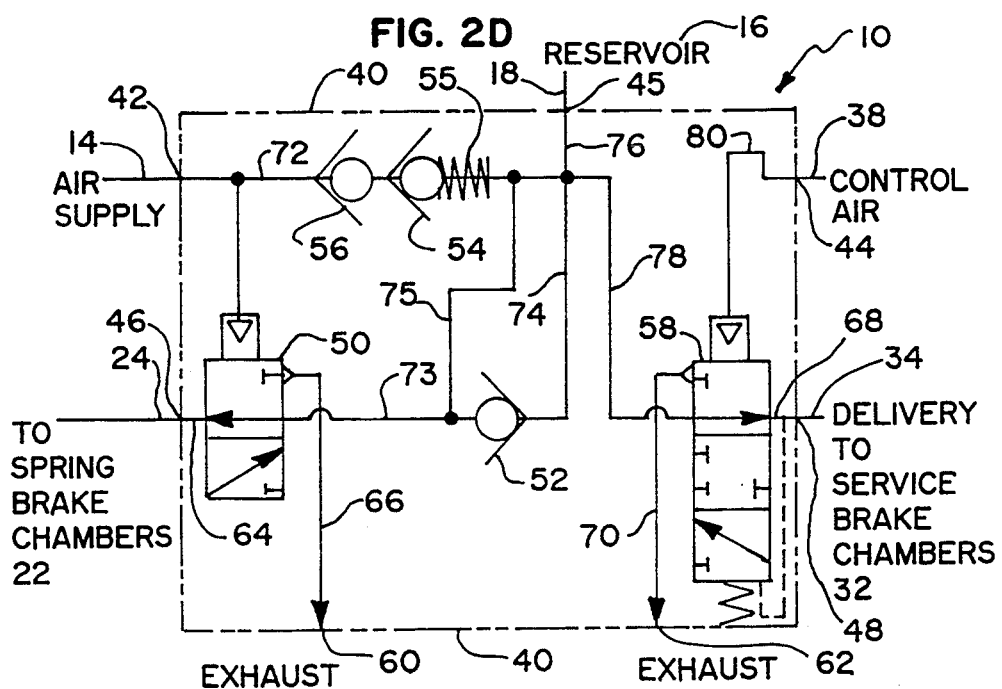

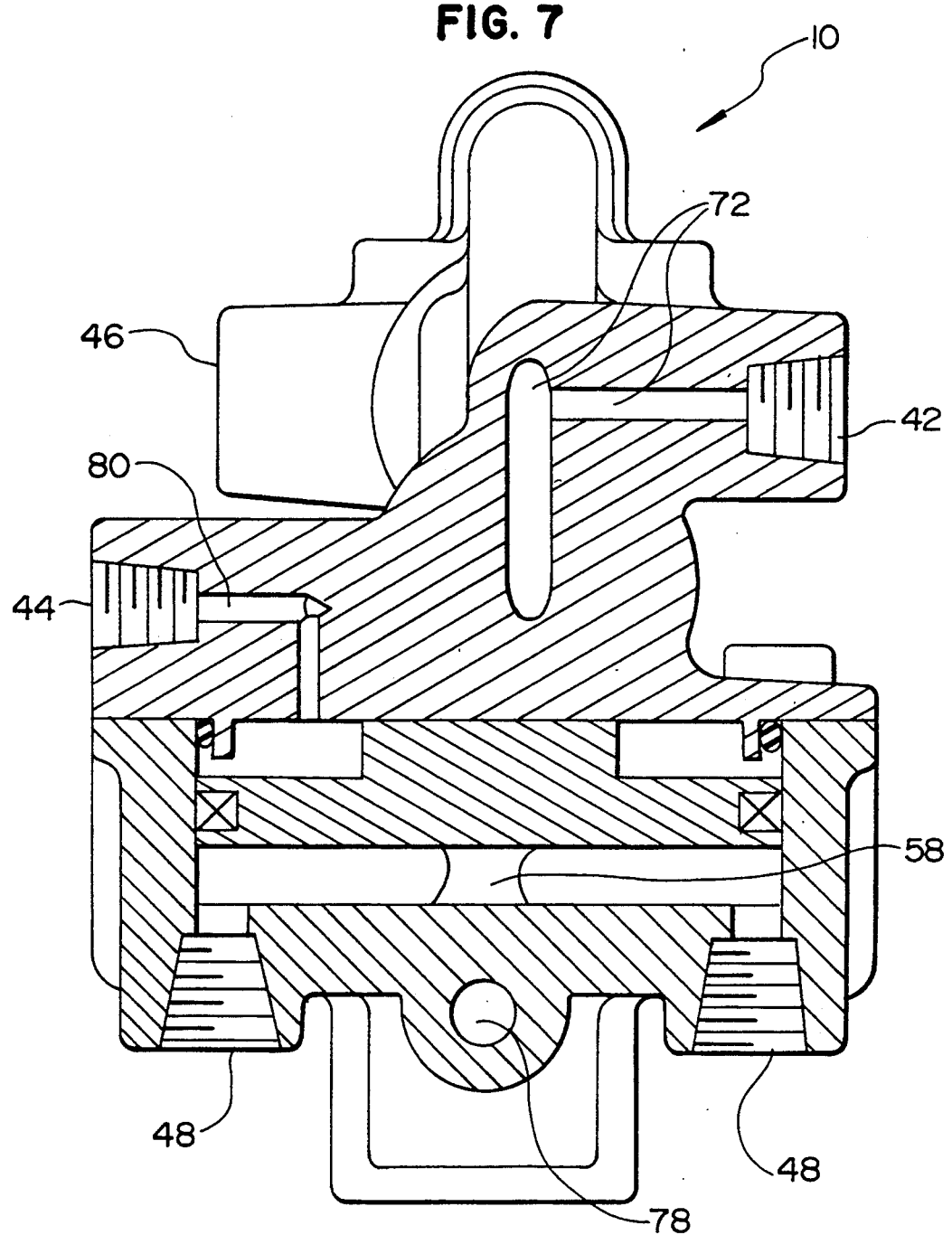

FULL-FUNCTION VALVE FOR HEAVY DUTY SEMI-TRAILER BRAKE SYSTEMS

FIELD OF THE INVENTION

This invention relates to an improvement to a full-function brake valve for use in fluid pressure braking systems primarily employed on the semi-trailers of heavy-duty highway tractor-trailer vehicle combinations. In particular, the invention is an improvement to the full-function brake valve disclosed in U.S. Pat. No. 5,236,250 ("the '250 patent"), which is assigned to the assignee of the present application. The '250 patent is incorporated by reference herein. Specifically, the present invention relates to an improvement that promotes safety and efficient operation in a braking system while ensuring compliance with Federal Motor Vehicle Safety Standard ("FMVSS") 121.

BACKGROUND OF THE INVENTION

To meet all of the emergency and service requirements of modern heavy-duty highway tractor-trailer combinations, while meeting all of the pertinent governmental regulations, including FMVSS 121, the trucking industry has resorted to a number of trailer semi-brake valve arrangements which have led to complexity, high costs, installation and maintenance difficulties and related problems. FMVSS 121 has recently been revised to require a minimum supply line pressure of 70 psig in service braking systems. A minimum governor cut-in pressure of 85 psig is also required by FMVSS 121.

The 70 psig minimum supply line requirement is typically met by adjusting a valve spring associated with a pressure protection valve that governs the pressure at which air is supplied to the spring brakes and to service brake air reservoirs. Because 100% compliance with the 70 psig supply line minimum is required, the pressure protection valve must be adjusted to maintain pressure in excess of 70 psig to ensure that the 70 psig minimum requirement is met in spite of worst-case stack-up of tolerances and small system leaks. In some cases, the pressure protection valve must be set to maintain a supply line pressure in excess of the 85 psig minimum governor cut-in pressure to ensure compliance with the 70 psig minimum supply pressure requirement.

If the pressure protection valve setting is higher than the minimum governor cut-in pressure, it is possible that the system pressure in a charging vehicle could be smaller than the setting of the pressure protection valve. In this case, it would be impossible to release the parking brakes or to fill the service brake reservoir of the vehicle to be charged. An improved full-function valve that overcomes this problem is desirable.

SUMMARY OF THE INVENTION

The present invention is an improvement to the existing full-function valve. According to the invention, the spring setting of the pressure protection valve is reduced and made proportional to the air pressure in the spring brake system by connecting a passageway between the spring brake system and the pressure protection valve. Thus, the overall resistance of the pressure protection valve is variable depending on the pressure in the spring brake system. When the system is initially at rest with the spring (parking) brakes applied, there is no pressure in the spring brake system (that is, the spring brake system is at atmospheric pressure). Moreover, the spring brake system and service brake reservoir are isolated from supply air by the pressure protection valve. In this situation, the spring setting of the pressure protection valve exercises total control over the pressure protection valve operational threshold. After this initial operational threshold is exceeded, the pressure protection valve allows air to flow to the spring brakes and the service brake reservoir. As pressure in the spring brake system increases, this pressure complements the operational threshold of the pressure protection valve. Thus operational threshold of the pressure protection valve increases proportionally to the pressure in the spring brake system. The initial operational threshold of the pressure protection valve is intentionally set lower than the typical pressure available from conventional charging vehicles. As charging progresses, the pressure protection setting increases to ensure compliance with the 70 psig minimum supply line requirement of FMVSS 121.

BRIEF DESCRIPTION OF THE DRAWINGS

The present invention may be more clearly understood from the following description of a specific and preferred embodiment read in conjunction with the accompanying schematic and detailed drawings, wherein;

FIGS. 2A-2F are functional schematics of the improved full-function valve of the present invention illustrating various functional modes of the valve during the charging of the brake system and subsequent braking cycles;

FIG. 7 is a cross-sectional view taken along the section line 7—7 of FIG. 4 and shows still other communicating passageways not otherwise depicted in FIGS. 5A-5F.

Figure 1:
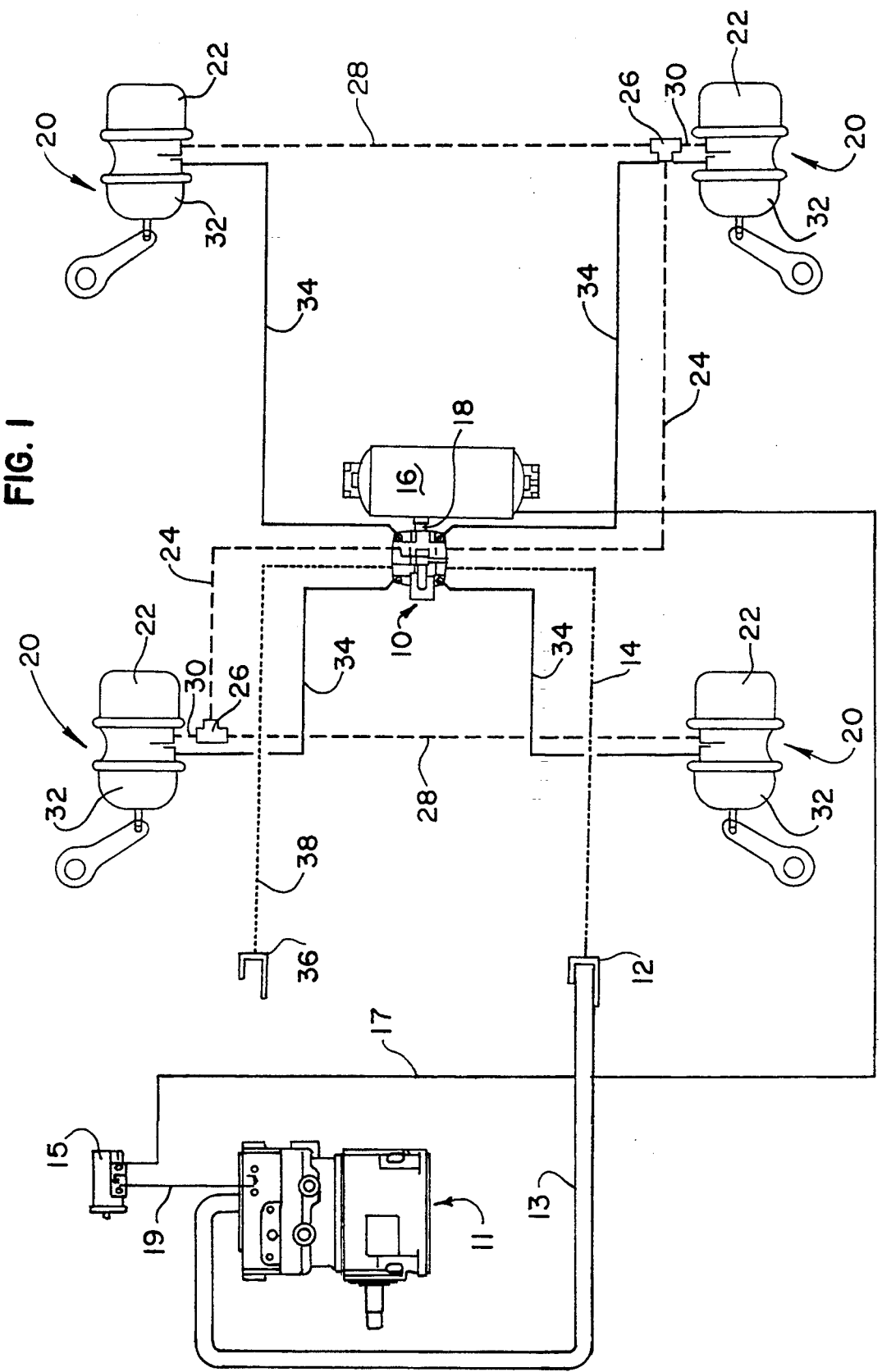
FIG. 1 is an overall schematic of a semi-trailer tandem brake system wherein the improved full-function valve of the present invention is advantageously employed.

It should be understood that the drawings are not necessarily to exact scale and that certain aspects of the embodiments, particularly the functional schematics of FIGS. 2A-2F, are illustrated by graphic symbols, schematic representations and fragmentary views. It should be also understood when referring to physical relationships of components by terms such as "upper", "lower", "upward", "downward", "vertical", horizontal", "left", "right", or the like, such terms usually have reference to the orientation depicted in the drawings. Actual embodiments or installations thereof may differ, depending upon the particular semi-trailer for which the braking system is designed. It should also be understood that the term "passageway" is not necessarily limited to a tubular path or other regularly-shaped but also encompasses fluid communicating spaces, chambers and the like.

While much mechanical detail, including other plan and section views of the particular embodiment depicted has been omitted, such detail is not per se part of the present invention and is considered well within the comprehension of those skilled in the brake arts without further amplification in the light of the present disclosure. Moreover, details shown in certain views are sometimes omitted in other views as unnecessary and in the interest of simplicity. It should be understood, of course, that the invention is not limited to the particular embodiment illustrated.

DETAILED DESCRIPTION OF DRAWINGS

To differentiate the pressurized air that fills the reservoir and actuates the spring and services brakes from the pressurized air which controls the relay valve module, the former is referred to herein as supply air, and the latter as control air. Similarly, the respective ports are referred to as the supply port and the control port or, alternatively, as the supply air port and the control air port. As those skilled in the art will recognize, supply air is sometimes termed emergency air, and control air is sometimes termed service air, terms not used herein.

Because most modern-day trailer brake systems employ pressurized air as the fluid medium for actuation and control purposes and such use is contemplated in the presently-known best-mode embodiment described herein, the disclosure herein set forth assumes such medium to be used. As those skilled in the art will recognize, however, the invention is not necessarily limited thereto and the inventive concept may be adapted to other fluid media.

Referring to FIG. 1, the schematic represents a semitrailer tandem brake system wherein the unitary full-function valve 10 of the present invention is advantageously employed. Pressurized supply air is provided to the system by an air compressor 11 commonly located on a tractor-trailer combination. It is desirable for the compressor 11 to provide air compressed to about 125 psig. However, in actual practice, compressors often provide air at much lower pressures. Compressed air is supplied to a gladhand connector 12 through a line 13. Subsequently, the compressed air is communicated to unitary full-function valve 10 via line 14.

As will be described in detail, the pressurized air is directed by valve 10 to reservoir (tank) 16 via line 18. Pressurized air is also directed by full-function valve 10 to the dual chambers of brake actuators 20, the spring (parking) brake chambers 22 thereof being in fluid communication with full-function valve 10 via lines 24, T-couplings 26 and lines 28 and 30, and the service brake chambers 32 thereof being in fluid communication with full-function valve 10 via lines 34. Control air from the tractor is received via gladhand 36 and communicated to full-function valve 10 via line 38.

An air compressor governor 15 is employed to control the supply of compressed air to the full-function valve 10. The operation of the governor 15 is well-known in the field. Briefly, the compressor 11 operates in either a loading or an unloading mode. In the loading mode, the compressor 11 supplies compressed air to the full-function valve 10. No compressed air is provided by the compressor when it is operating in the unloading mode. The governor 15 monitors air pressure in the reservoir 16 via line 17 and switches the compressor from the unloading mode to the loading mode via a control line 19 when the reservoir pressure falls below a predetermined level. This predetermined level is known in the aforementioned governor cut-in pressure.

Initially, upon charging to the brake system, the spring brake chambers 22 of brake actuators 20 and reservoir 16 receive pressurized air through full-function valve 10 directly from the compressor 11 via gladhand connector 12 and lines 13 and 14. Upon being fully charged, spring brake chambers 22 thereafter may be in fluid communication with reservoir 16 as well as the compressor 11, as will become apparent as the description proceeds. While shown as a single vessel or tank, reservoir 16 may take the form of a plurality of vessels in series or parallel, particularly if size and space limitations or configurations are factors.

In the following detailed descriptions of the schematics of full-function valve 10 in FIGS. 2A–2F and then of the actual valve itself in FIGS. 3, 4, and 5A–5F, the same reference numerals are used to the extent possible so that the respective descriptions can be more readily related and understood. Similarly, some of the reference numerals used in connection with FIG. 1 are carried over, although the relative positions of certain of the elements may be changed.

Referring to FIG. 2A, unitary full-function valve 10 is shown schematically at rest. Supply line 14, control line 38, reservoir line 18, spring brake chamber line 24 and service brake chamber line 34 are all at atmospheric pressure. Supply air line 14 is connected to housing or body 40 of full-function valve 10 at port 42. Control air line 38 is connected to valve body 40 at port 44. Line 18 to reservoir 16 is connected to valve body 40 at port 45. Line 24 to the spring brake chambers 22 is connected to valve body 40 at port 46. Line 34 to the service brake chambers 32 is connected to valve 40 at port 48.

Unitary full-function valve 10 houses within body 40 a plurality of valve modules, namely, spring brake valve module 50 and associated one-way check valve 52, biased one-way pressure protection valve module 54 with associated one-way check valve 56, and relay valve module 58. The exhaust outlet in body 40 from spring brake valve module 50 is depicted at 60. The exhaust outlet in body 40 from relay valve module 58 is depicted at 62.

As previously noted, the present invention involves the operation of the pressure protection valve 54. As will be described below, the setting or operational threshold of the pressure protection valve is governed in part by a valve spring 55. According to the invention, the operational threshold of the pressure protection valve is variable and is controlled in part by the pressure in the spring brake system. As will be described below, the operational threshold of the pressure protection valve 54 increases as a function of the pressure in the spring brake system. Those of ordinary skill in the field will appreciate that, by making the operational threshold of the pressure protection valve vary with the pressure in the spring brake system, the initial setting of the spring 55 may be reduced to allow operation of the pressure protection valve 54 at a lower pressure than would otherwise be necessary when no pressure is present in the spring brake system. This feature prevents the previously described problem of being unable to charge the brake system if the operational threshold of the pressure protection valve exceeds the governor cut-in pressure because in the present invention the setting of the spring is reduced to allow operation of the pressure protection valve below the 85 psig minimum governor cut-in pressure required by FMVSS 121. As pressure in the spring brake system increases, the operational threshold of the pressure protection valve also increases proportionally to ensure compliance with the 70 psig minimum supply pressure required by FMVSS 121. It is within the ability of those of ordinary skill in the field to determine values for the setting of the spring 55 that allow the benefits of the invention to be obtained while ensuring compliance with the requirements of FMVSS 121.

In the at-rest position, spring brake line 24, which is attached to port 46 of valve body 40 is connected by internal passageway 64, spring brake valve module 50 and internal passage way 66 to exhaust port 60, whereby the spring brakes are fully applied. The service brake line 34, which is attached to port 48 of valve body 40, is connected by internal passageway 68, relay valve module 58 and internal passageway 70 to exhaust port 62.

A passageway 75 connects the pressure protection valve 54 to pressurized air from the spring brake system by a passageway 73. The specific details of the interface of the passageway 75 with the pressure protection valve 54 are described below with reference to FIGS. 5A–5F. In the at-rest position of FIG. 2A, there is no pressure in the spring brake system, so the operational threshold of the pressure protection valve is controlled exclusively by the setting of the spring 55. Other elements shown in FIG. 2A, including passageways 72, 74, 76, 78 and 80 will be described hereinafter.

Schematic FIG. 2B shows full-function valve 10 after the pressure of the supply air in line 14, port 42 and internal passageways 72 has increased above a first predetermined pressure, typically about 40 psig, but is still below a second predetermined pressure threshold corresponding to the setting of the spring 55. In response to a pressure of at least about 40 psig in passageways 72 the piston of spring brake valve module 50 has shifted downwardly into the charging position.

Instead of being connected to the exhaust port, line 24, port 46, and internal passageway 64 are now connected via internal passageway 73 and one-way check valve 52 to internal passageway 74. As previously noted, passageway 73 is also connected to the pressure protection valve 54 via internal passageway 75. Pressurized air, however, will not flow to the spring brakes via line 24 or the pressure protection valve 54 via line 75 even though port 46 is now connected via passageway 64, module 50, passageway 73, check valve 52 and passageways 74 and 76 to port 45, line 18 and reservoir 16 because reservoir 16 is still at atmospheric pressure. The pressure in line 72 is not available because biased pressure protection value module 54 does not open until the pressure in line 72 rises above a second predetermined threshold.

While the ball of one-way check valve 56 is shown seated in FIG. 2B, it is initially momentarily unseated while the cavity between it and pressure protection valve module 54 is being pressurized to substantially that of passageway 72. It is unseated, of course, anytime that there is a pressure differential across it greater than that required to overcome the slight force of the usual spring (not shown) holding the ball in its seated position.

Schematic FIG. 2C shows full-function valve 10 with pressurized air in the supply line 14, port 42, and passageways 72 greater than the second predetermined pressure. The biased one-way pressure protection valve module 54 and associated one-way check valve 56 are now open, and pressurized air is flowing into reservoir 16 via passageway 76, port 45 and line 18. Pressurized air is simultaneously flowing to the spring brake chambers via passageways 74, one-way check valve 52, which is now open to let the air through, passageway 73, spring brake valve module 50, passageway 64, port 46 and line 24.

As the pressure increases in the passageway 73, pressurized air flows through passageway 75 to the pressure protection valve 54. This pressure causes the operational threshold of the pressure protection valve 54 to increase from the second predetermined pressure. The operational threshold of the pressure protection valve continues to increase until the pressure in the spring brake system stabilizes.

The fact that the spring brake chambers 22 can not be pressurized prior to enablement of the service brake system by the simultaneous pressurization of reservoir 16 is an important safety feature which is absent from many prior art systems. In short, the spring brakes are not released until the pressure is available to actuate the service brakes. Otherwise, circumstances could develop whereby a trailer would have no effective braking.

When the air pressure in the spring brake chambers equals the supply air pressure, one-way check valve 52 will close, retaining the pressure in spring brake chambers 22. This will partially isolate the pressure in the spring brake chambers 22 from the variations in air pressure in the remainder of the trailer brake system. This will also prevent the pressurized air in the spring brake chambers 22 from escaping in the event of a failure of reservoir 16 or associated lines. At this point, the operational threshold of the pressure protection valve stabilizes and remains constant in the event of a leakage failure of the reservoir 16.

Schematic FIG. 2D shows full-function valve 10 when service brake control air is supplied via line 38, port 44 and passageway 80 to the piston of relay valve module 58, which may otherwise be of conventional design. As shown schematically, the module shifts and communicated pressurized air from reservoir 16 (and supply air under some circumstances) to the service brake chambers 32 via line 18, port 45, passageways 76 and 78, module 58, line 68, port 48 and line 34. This results in application of the trailer service brakes in a known manner.

Figure 2E:
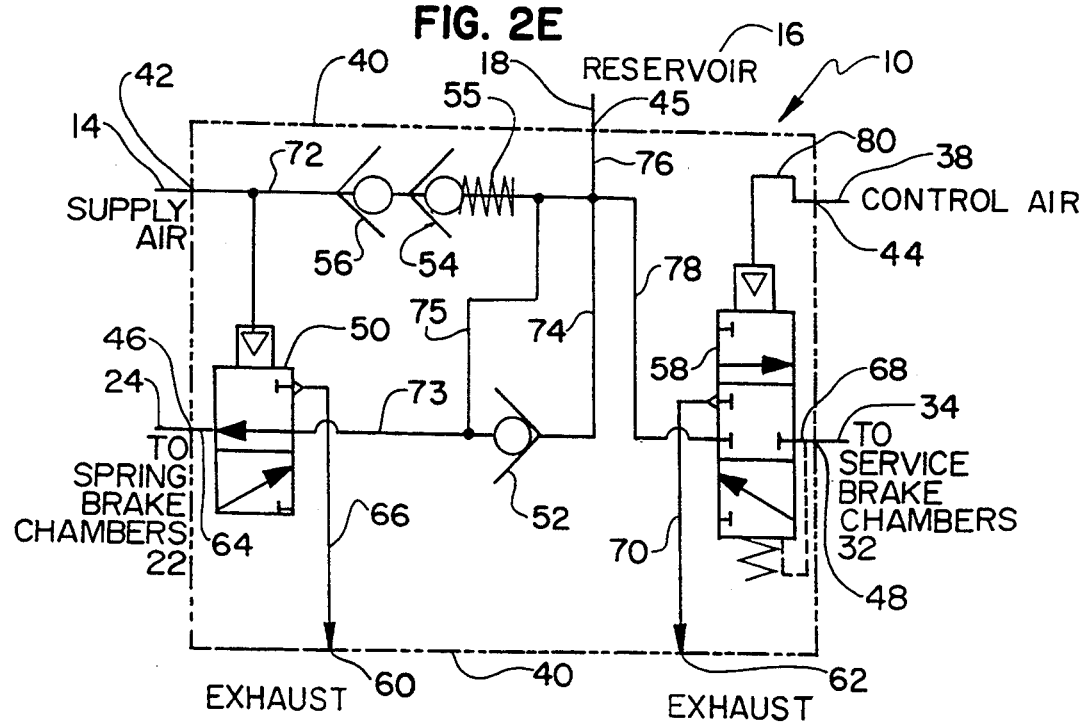

FIG. 2E depicts the situation when the pressure of the air in the service brake chambers 32 is substantially equal to the pressure of the control air supplied via line 38, port 44 and passageway 80. As those skilled in the art will recognize, this causes relay valve module 58 to shift to the so-called lap position. In this position, reservoir 16 and connecting passageways are isolated from the service brake chambers 32, and the service brake chambers 32 are also isolated from exhaust 62, a stabilized, brake-applied condition.

Figure 2F:
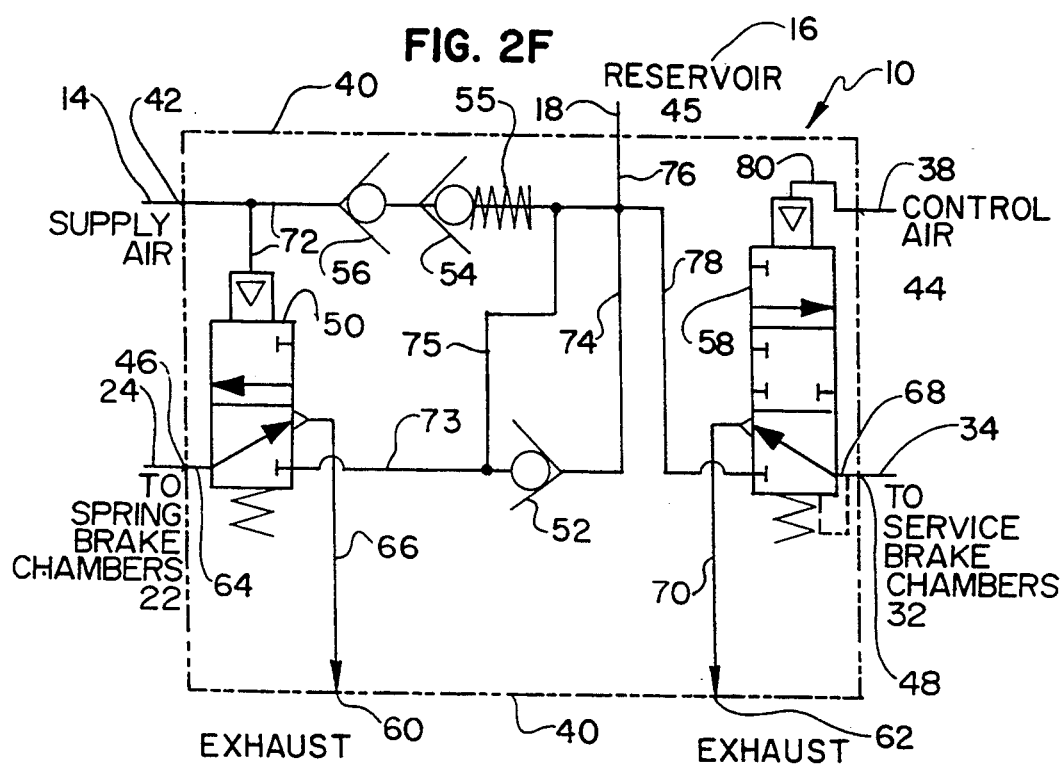

FIG. 2F schematically depicts full-function valve 10 when supply air from line 14 is evacuated or vacated. Complete evacuation would, of course, result in spring brake valve module 50 returning to its at-rest position, which releases pressurized air in the spring brake chambers 22 to exhaust 60. The spring brake valve module 50, however, will not shift to this exhaust position unless and until the supply air in line 72 is less than the first predetermined pressure of about 40 psig. This prevents the spring brakes 22 from applying prematurely in case of a failure in the supply line source.

The pressure protection one-way check valve 56 traps the pressurized air in the reservoir, preventing the air from escaping through port 42 and supply line 14. As will be apparent from FIG. 5F, pressure protection valve 54 remains open because the pressure trapped to the right of check valve 56 is above the increased operational threshold resulting from the pressure in the passageway 73. The pressurized air thus trapped in reservoir 16 will be available to release the spring brakes the next time supply air of at least the first predetermined pressure of about 40 psig is available to the trailer.

The preferred embodiment of the full-function valve of the present invention presented in FIGS. 3-7 is best understood with reference to the schematic diagrams of FIGS. 1 and 2 already discussed. For this reason, the same reference numbers are employed to the extent feasible.

Figure 3:
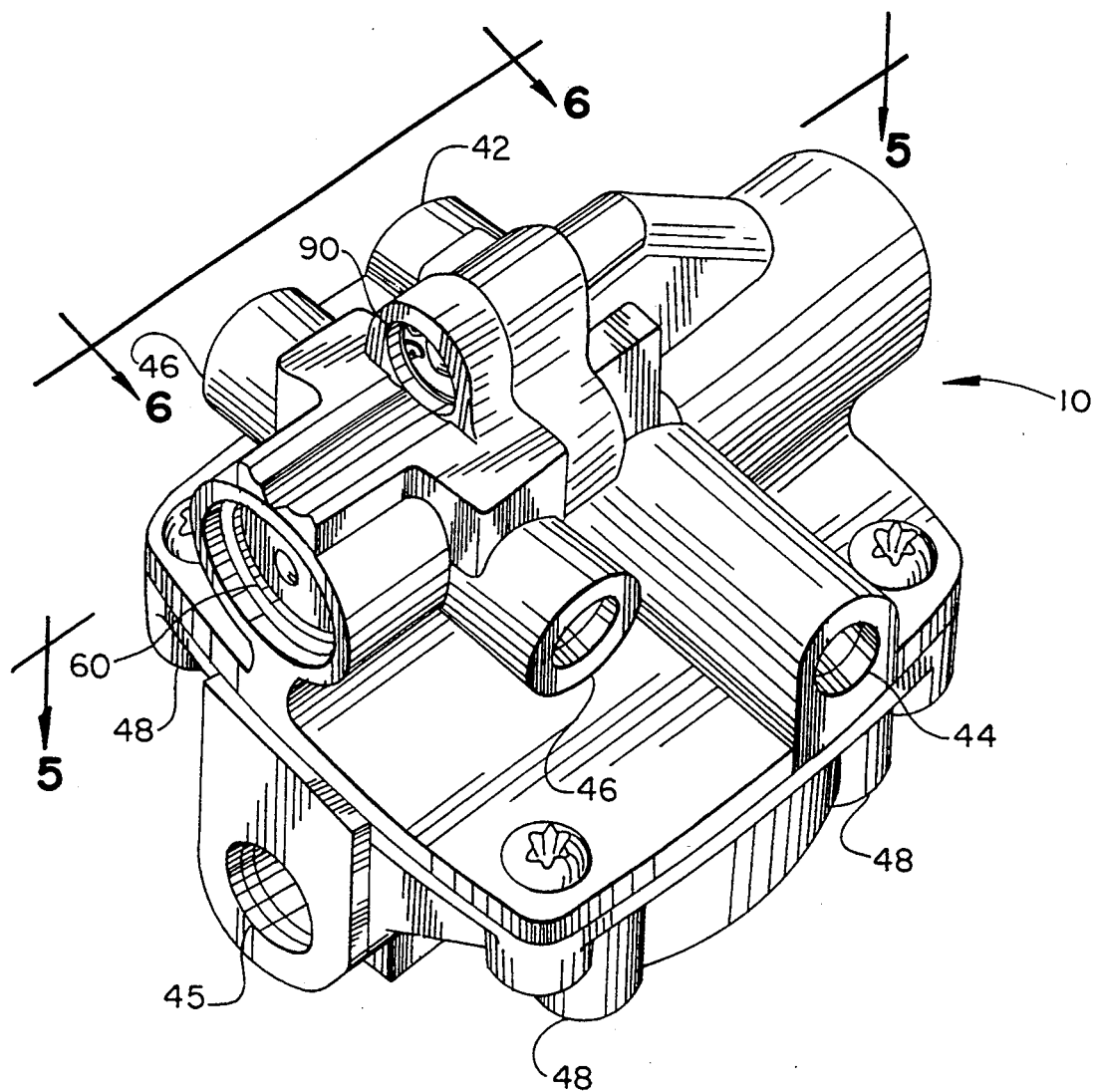
FIG. 3 is a full-scale perspective view of the exterior of a preferred embodiment of the improved full-function valve of the present invention.
Figure 4:
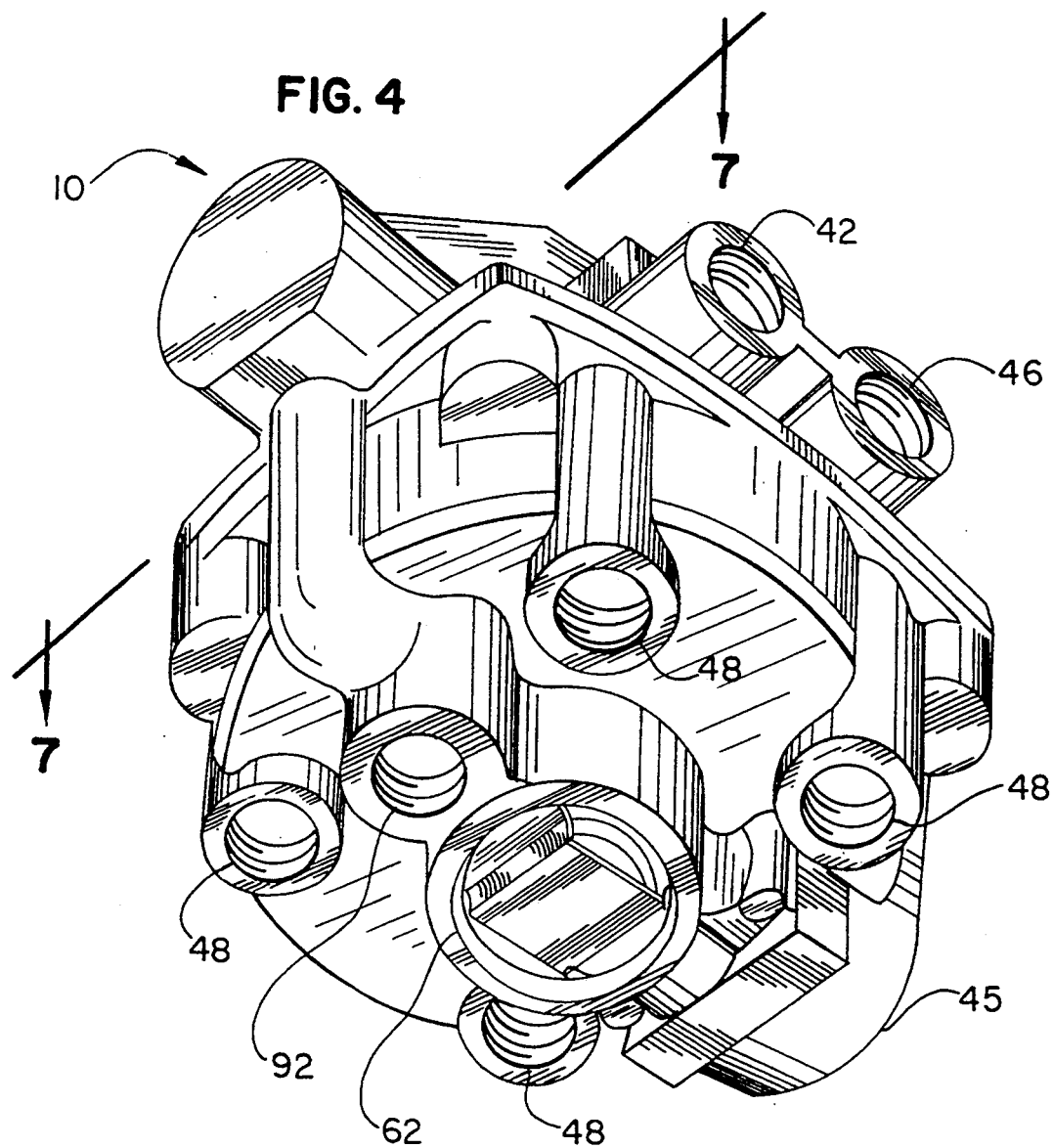
FIG. 4 is a similar full-scale perspective view of the preferred embodiment of FIG. 3 as seen from the opposite direction.
Figure 5A:
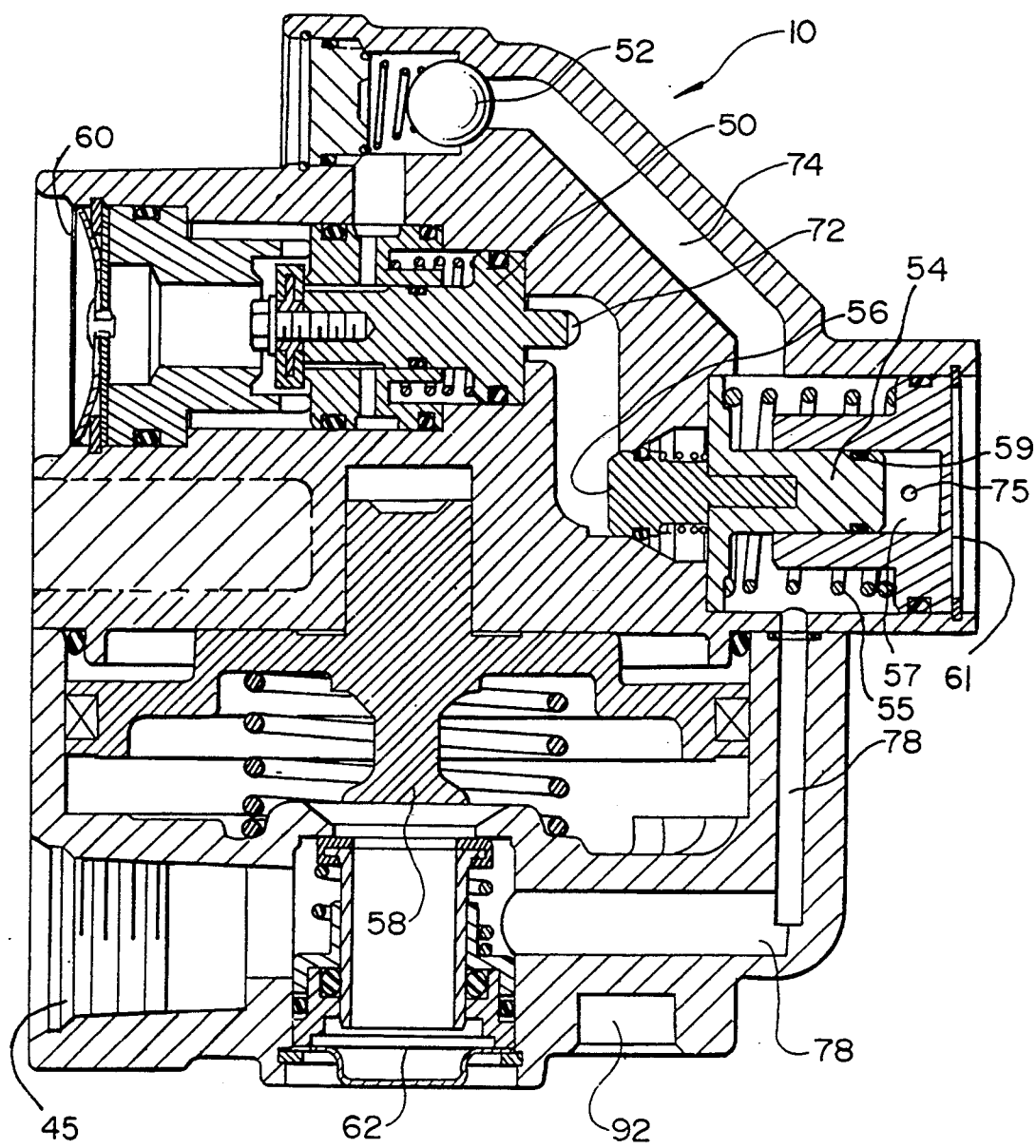
FIGS. 5A-5F are a series of sectional views taken along the section line 5—5 of FIG. 3 and show the positions of internal mechanical components corresponding to the functional modes schematically illustrated in FIGS. 2A-2F, respectively.
Figure 5B:
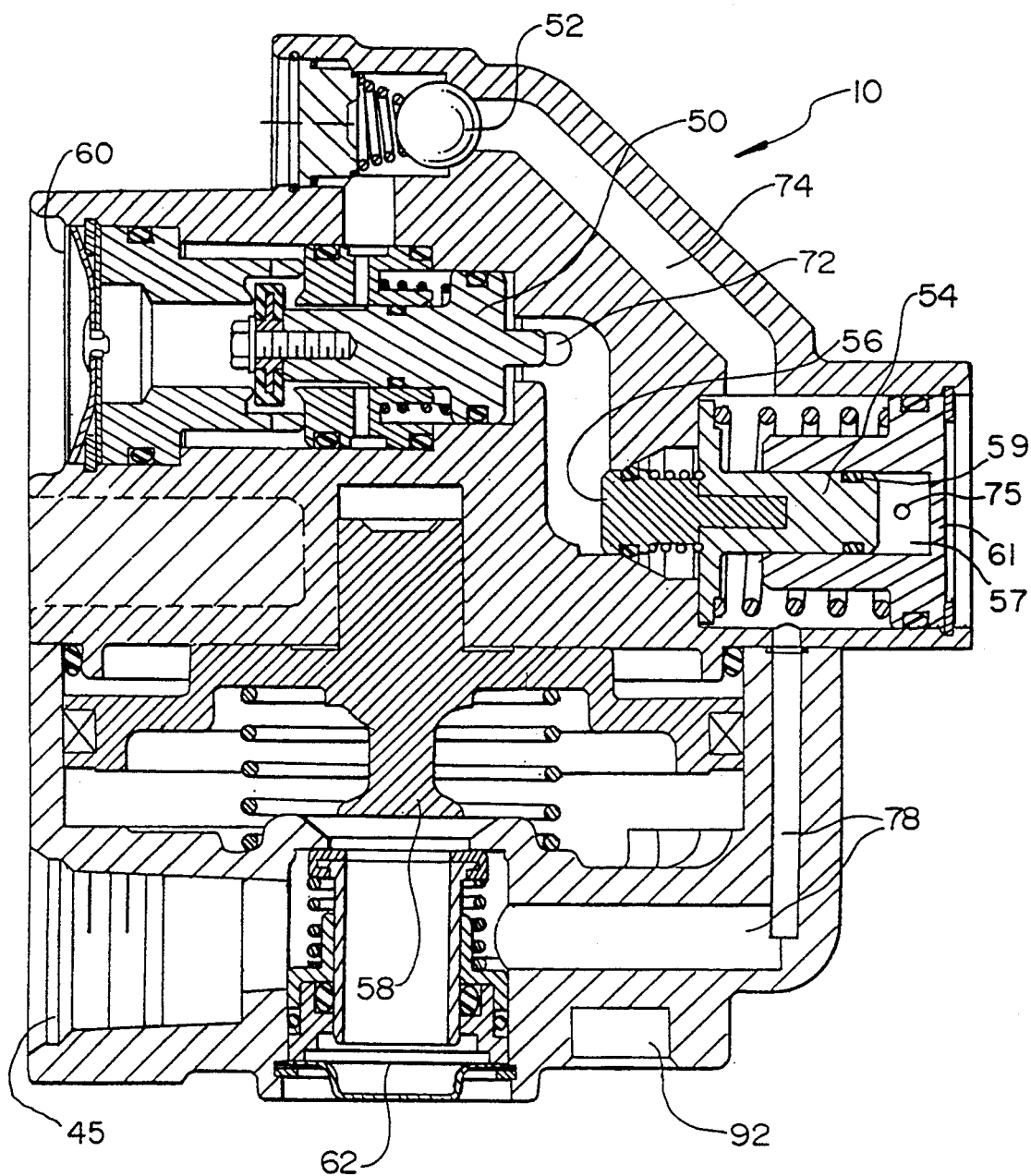
Figure 5C:
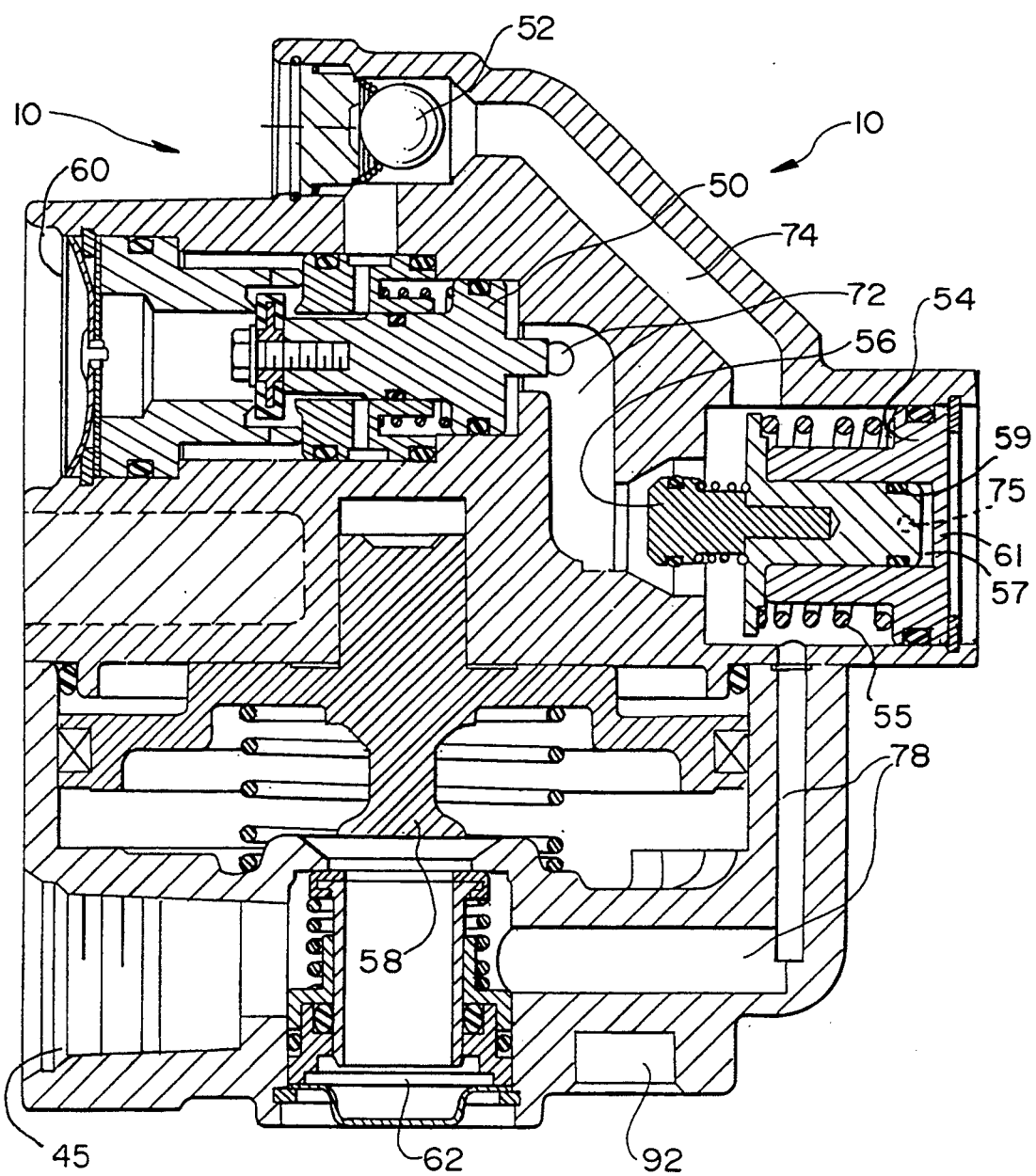
Figure 5D:
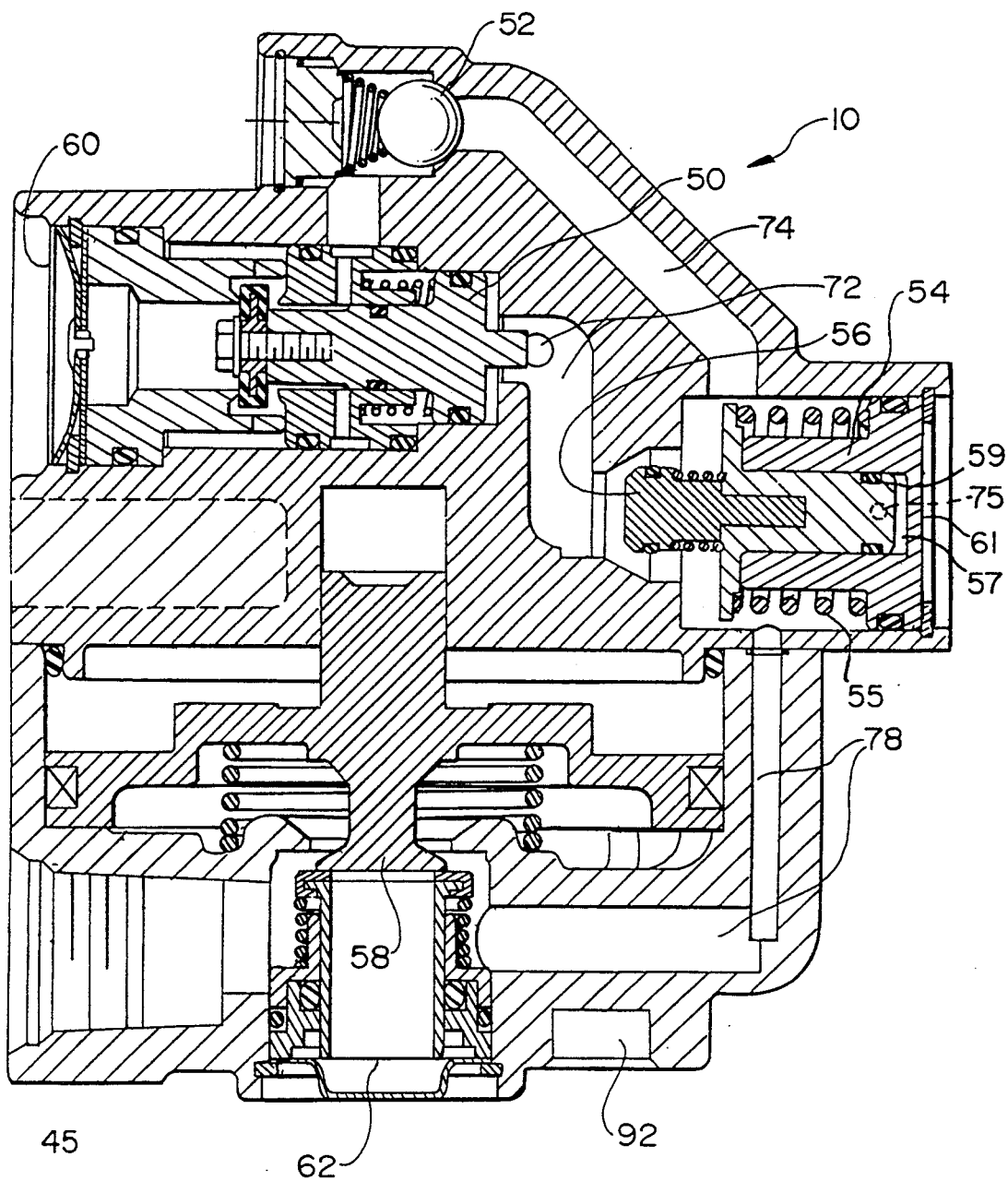
Figure 5E:
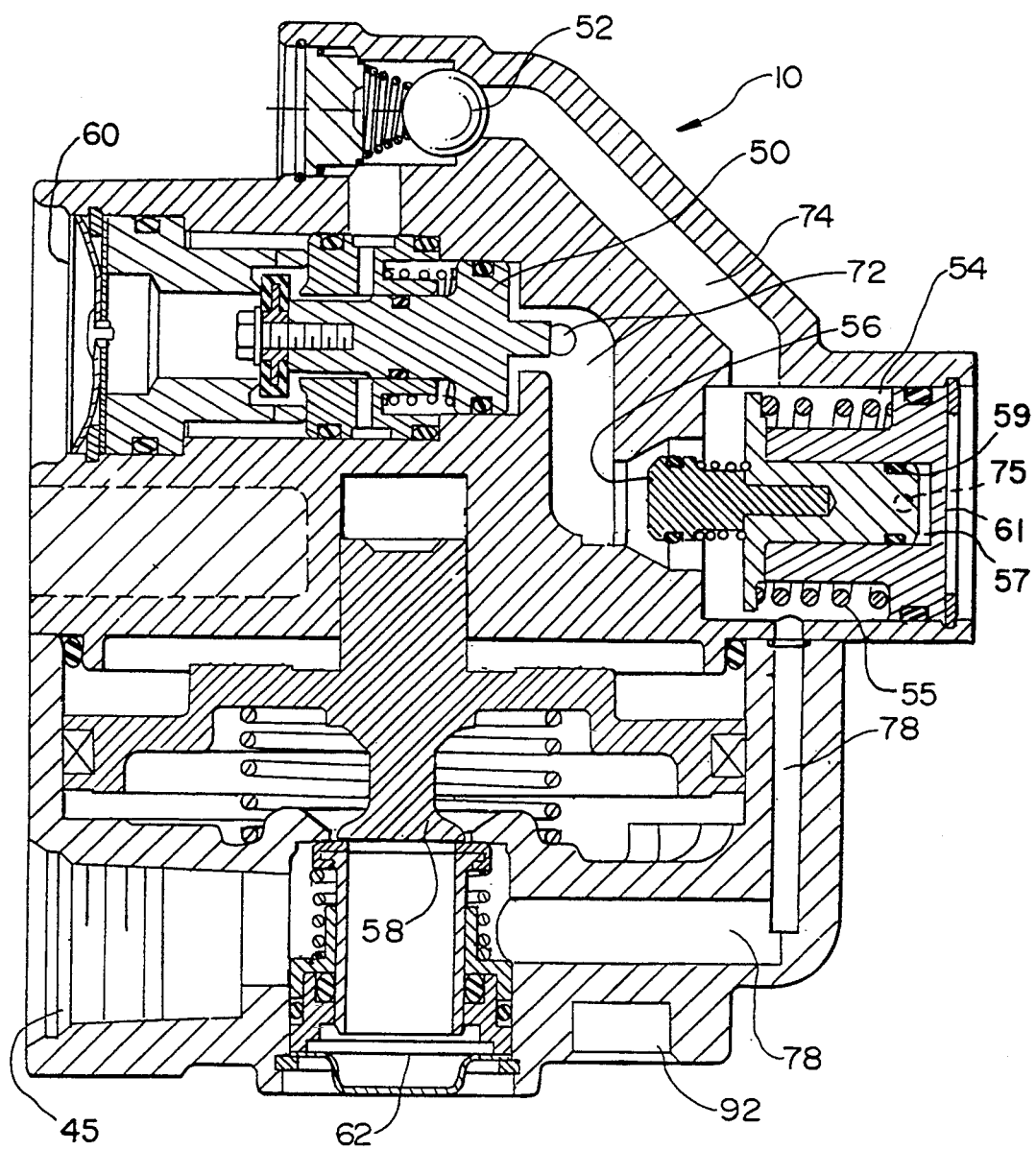
Figure 5F:
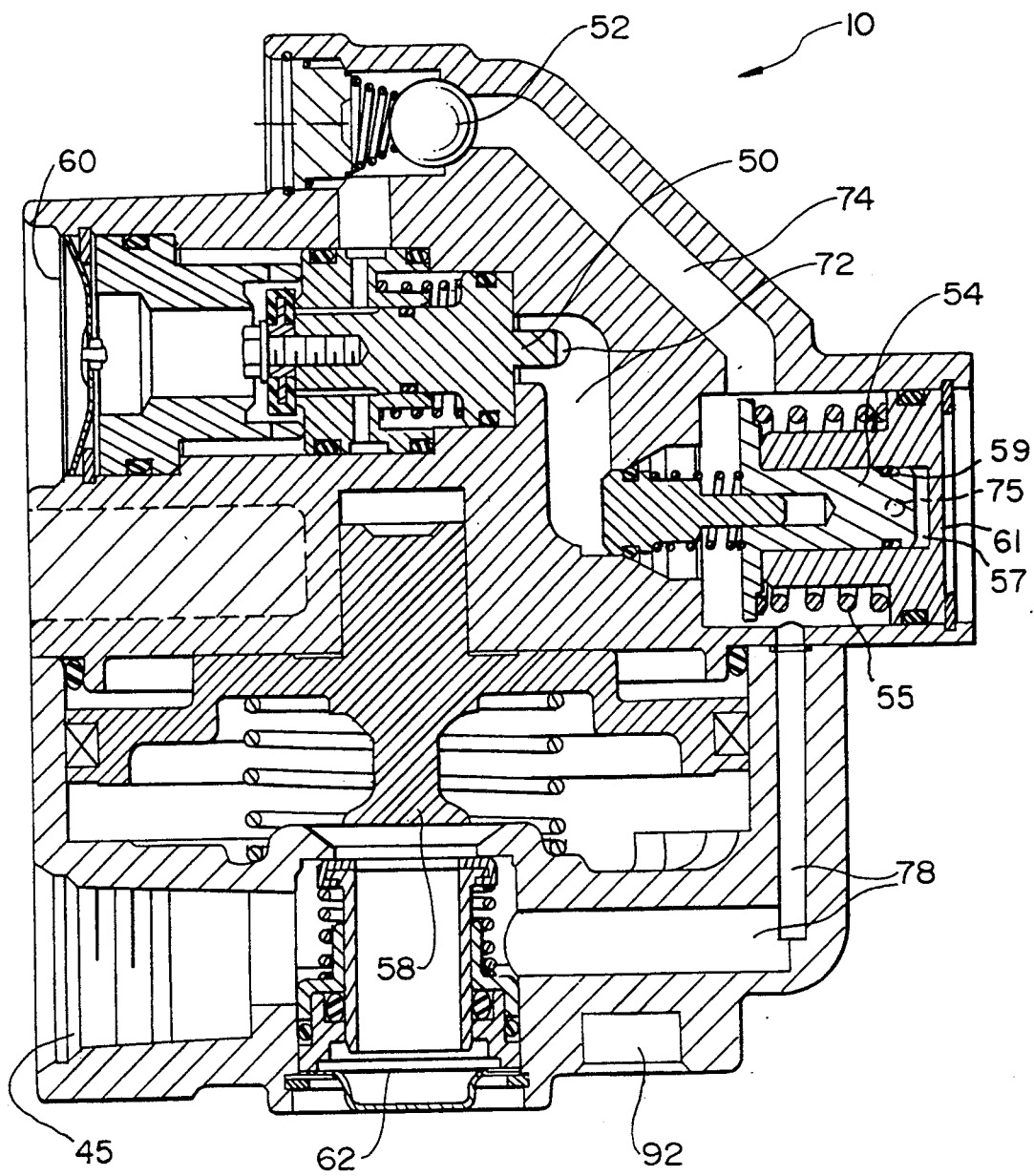

The perspective views of the preferred embodiment of FIGS. 3 and 4 serve to illustrate the compactness of the unitary design. Referring to FIG. 3. the overall height of the actual full-function valve depicted is approximately 6", the overall length (lower left to upper right of FIG. 3) is about 5½" and the overall width (upper left to lower right) is approximately 4½".

Consistent with the tandem brake system schematic of FIG. 1, the actual embodiment of FIGS. 3-4 has one port 42 for supply air, one port 44 for control air, two delivery ports 46 for the spring brake chambers and four delivery ports 48 for the service brake chambers. FIG. 3 also shows the exhaust port 60 for the spring brake valve module 50 and port 45 to which the reservoir is connected, as depicted in FIGS. 5A-5F.

FIG. 3 also shows a non-functioning sealed access port 90 and FIG. 4 shows a non-functioning sealed port 92 for possible future embodiments. Neither contribute to the functioning of the present preferred embodiment of the invention and need not be discussed further.

The section views 5A-F, which are taken along the line 5—5 of FIG. 3, show the essentials of the valve. These include spring brake valve module 50 and associated one-way check valve 52, biased one-way pressure protection valve module 54 with associated one-way check valve 56 and relay module 58 which, as previously indicated, may be of conventional design readily understood by those skilled in the art without further amplification.

The springs associated with spring brake valve module 50 in association with the piston areas exposed to the pressurized air in passageways 72 provide the aforementioned first predetermined pressure, typically 40 psig. As previously noted, the spring 55 determines the second predetermined pressure. After the second predetermined pressure is exceeded, the pressure in the passageway 75 augments the action of the spring 55 to increase the operational threshold of the pressure protection valve 54. A wall 61 seals the chamber 75 to create a pressurized space 57 so that pressurized air from the spring brake system acts to retard the movement of the pressure protection valve module 54 in proportion to the pressure in the spring brake system.

O-ring 59 is disposed around the pressure protection valve 54 to provide an airtight seal with the pressurized space 57. Passageway 75, shown schematically in FIGS. 5A-F, communicates spring brake air from the passageway 73 to the pressurized space 57. Any known method of providing communication for spring brake air through the passageway 75 to the pressurized space 57 is within the scope of the invention.

Figure 6:
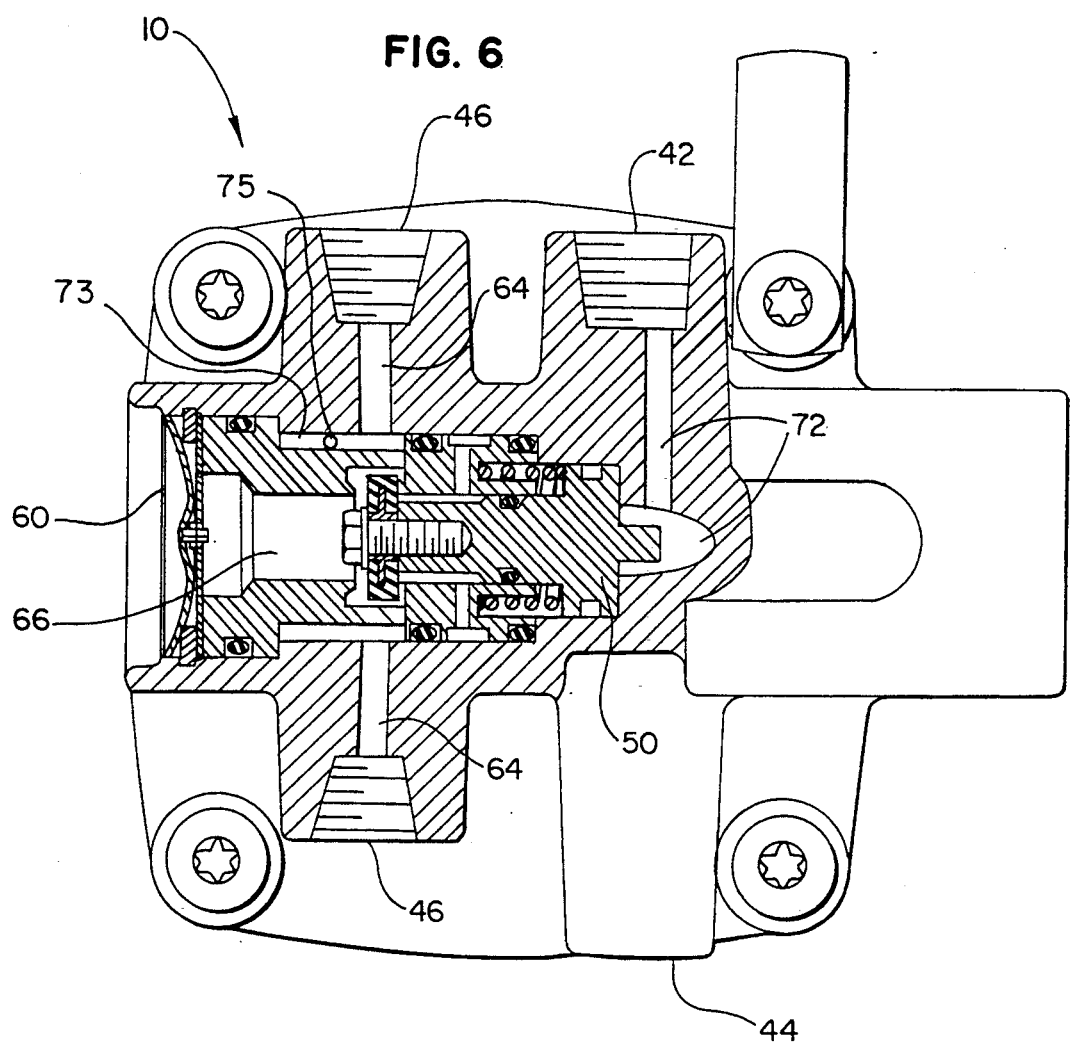
FIG. 6 is a cross-sectional view taken on section line 6—6 of FIG. 3 and shows communicating passageways not otherwise depicted in FIGS. 5A-5F.

As shown by section lines 6—6 and 7—7 of FIGS. 3 and 4, the section views of 6 and 7, respectively, are taken on different planes than that of FIGS. 5A-5F. They show internal passageways which are not depicted or apparent in the section view of FIGS. 5A-5F. Specifically, FIG. 6 shows the passageways 64 from the spring brake control module 50 to ports 46 and the passageway 66 from the spring brake control module to exhaust port 60. FIG. 6 also shows the passageways 72 from the supply port 42. The passageway 75 that provides pressurized air from the spring brake system to adjust the operational threshold of the pressure protection valve 54 is shown schematically in FIG. 6. FIG. 7 again shows from a different angle the passageways 72 from supply port 42, and also the passageways from the relay control module 58 to the ports 48 which are connected to the service brake chambers.

Since the positions of the internal components of FIGS. 5A-5F correspond to the functional modes already depicted and described in connection with the schematic presentation of FIGS. 2A-2F, those skilled in the art will readily recognize and understand the operation of actual embodiment. This is apparent from a side-by-side comparison of FIGS. 2A-2F and 5A-5F, respectively.

RECAPITULATION OF OPERATION

Supply air enters valve 10 via line 14, port 42 and the chamber formed by passageways 72. Air pressure will begin to rise in this chamber, to the point at which it causes the spring brake control module 50 to shift at about 40 psig, and the pressure protection valve module 54 to open at a second predetermined pressure, which is principally a function of the setting of the spring 55 in the pressure protection valve 54. The second predetermined pressure is chosen to ensure that it is below the minimum governor cut-in pressure of 85 psig to ensure that the brake system can be charged initially. Shifting of the spring brake control module 50 will allow pressurized air to enter the spring brake chamber 22. The pressurized air entering the spring brake chambers 50 will be from either reservoir 16 of the trailer, if there is pressurized air present, or from the supply port 42 via pressure protection valve module 54 and 56, or both. As a result of this arrangement, pressurized air cannot go directly from the supply line 14 into the spring brake chambers 22. This forecloses the possibility of the trailer being moved without service brake capability, a critical safety feature.

As the pressure in the spring brake chambers increases, pressurized air from the spring brake system flows through passageway 75 to the pressure protection valve 54. This pressure causes the operational threshold of the pressure protection valve 54 to increase in proportion to the air pressure in the spring brake system. After the pressure protection valve 54 opens, the operational threshold of the pressure protection valve 54 continues to increase proportionally with the pressure in the spring brake system until system pressure stabilizes. In this manner, the federally mandated minimum supply line pressure of 70 psig is met notwithstanding the fact that the second predetermined pressure is chosen to ensure that the brake system can be charged, not for compliance with the 70 psig minimum pressure requirement.

It is to be understood that any allowed claims based on this application are to be accorded a range of equivalence commensurate in scope with the advance made over prior art.

What is claimed is:

1. A unitary full-function valve for use in controlling the operation of a service brake system and a spring brake system in a vehicle, said valve comprising:

a valve body with multiple ports, including separate ports for providing fluid communication to at least one spring brake chamber, at least one service brake chamber, a fluid reservoir and an exhaust port; said valve body further including ports for receiving a pressurized supply fluid and a control fluid, said control fluid actuating said service brake system on demand and said supply fluid inhibiting the activation of said spring brake system so that said spring brake system is activated in the absence of said supply fluid;

a biased one-way pressure protection valve housed within said valve body for isolating fluid in said service brake system from fluid in said spring brake system when the pressure in said service brake system falls below a threshold pressure level; and a passageway within said valve body for connecting the fluid in said spring brake system with said biased one-way pressure protection valve to increase said threshold pressure level in proportion to the pressure level in said spring brake system.

2. The unitary full-function valve of claim 1 wherein said biased one-way pressure protection valve has an unbiased one-way check valve associated therewith.

3. A unitary full-function valve for use in controlling the operation of a service brake system having a service brake chamber and a spring brake system having a spring brake chamber in a vehicle, said valve comprising:

a valve body with multiple ports, including a spring brake port for providing fluid communication to said spring brake chamber, a service brake port for providing fluid communication to said service brake chamber, a fluid reservoir port for providing fluid communication to a fluid reservoir and an exhaust port; said valve body further including a supply fluid port for receiving a pressurized supply fluid and a control fluid port for receiving a control fluid, said control fluid actuating said service brake system on demand and said supply fluid inhibiting the activation of said spring brake system so that said spring brake system is activated in the absence of said supply fluid, said pressurized supply fluid in said fluid reservoir being communicated to said spring brake chamber only when said pressurized supply fluid is also communicated to said fluid reservoir;

a spring brake valve module within said valve body providing (i) fluid communication from said spring brake port to said exhaust port when a fluid pressure at said supply fluid port is less than a first predetermined pressure, and (ii) fluid communication from said fluid reservoir port to said spring brake port when said fluid pressure at said supply port is at or higher than said first predetermined pressure;

a relay valve module within said valve body which is responsive to control air signals received at said control fluid port of said valve body for employing said supply fluid to actuate said service brakes;

a biased one-way pressure protection valve housed within said valve body for isolating fluid in said service brake system from fluid in said spring brake system when a pressure in said service brake system falls below a threshold pressure level; and a passageway within said valve body for connecting the fluid in said spring brake system with said biased one-way pressure protection valve to increase said threshold pressure level in proportion to a pressure level in said spring brake system.

4. The unitary full-function valve of claim 3 wherein said spring brake valve module has a one-way check valve associated therewith whereby fluid communication from said fluid reservoir port to said spring brake port is one-way.

* * * * *